Fig. 2.

United States Patent Office 3,453,055
Patented July 1, 1969

3,453,055
OPTICAL SIGHTING DEVICES FOR LIGHT ANTIAIRCRAFT GUNS
Louis Bonna and Lucas Pun, Geneva, Switzerland, assignors to Brevets Aero-Mecaniques S.A., Geneva, Switzerland, a society of Switzerland
Filed June 1, 1965, Ser. No. 460,424
Claims priority, application Luxembourg, June 15, 1964, 46,322
Int. Cl. G02b 27/32; F41g
U.S. Cl. 356—255           5 Claims

ABSTRACT OF THE DISCLOSURE

A substantially vertical transparent plate bears a marking line of generally horizontal direction. A mechanism is provided for automatically displacing this transparent plate in a vertical direction by an amount directly proportional to the elevation of the gun to adjust the coefficient of proportionality according to the estimated apparent speed of the target.

---

The present invention relates to optional sighting devices for light anti-aircraft guns comprising at least one barrel pivotable about a horizontal axis mounted on a platform rotatable about a vertical axis with respect to a fixed base, said sighting devices being of the kind including an eyepiece and a window both fixed with respect to said platform, optical means operatively connected with the barrel in such manner as to direct into said eyepiece, whatever be the inclination of the barrel with respect to the platform, a light beam substantially parallel to the barrel which passes through said window, and between said optical means and said eyepiece, a transparent plate bearing a marking sign and adapted to be automatically displaced in response to the displacements of the barrel to enable a gunner placed on said platform to give the barrel the desired direction by causing the image of a target to coincide with said marking sign.

It is known that light anti-aircraft guns are to be used only against targets which are either in rectilinear horizontal flight, flying above the gun or at a distance thereof at most equal to a given limit value (for instance 400 m.) for releasing bombs, or in a rectilinear diving flight towards the gun or towards a ground target located at a distance from said gun at most equal to said limit value, with a dive angle ranging from 10° to 20° (attack with the aircraft guns or with rockets). When the diving aircraft is at a distance ranging from 500 to 600 m. for instance from the gun, firing is stopped because the aircraft, pulling out from the dive, is then practically impossible to follow aircraft flying at a height above 400 m. for instance, or which fly off laterally, are not fired upon.

It is also known that it is necessary to calculate for instance the following elements to determine with an optical sighting device the point of impact of the projectile fired by the gun upon an aircraft flying at high speed (assumed to be constant, with a rectilinear path of travel):

δ: apparent angle of fly;
α: excess of the angle of elevation;
Δ: prediction (angle).

It will be noted that, on account of what has been stated above, the only cases to be considered for a light gun are horizontal flight above or in the immediate vicinity of the gun and dive flights towards the gun or a target on the ground close to the gun. It follows that the practical field of use corresponds to a very small range of variation of angle δ on either side of its zero value.

Furthermore, the speed at which aircraft attack targets on the ground is generally at most 200 m./s. (that is to say 720 km./h.) because fast aircraft reduce their speed to this value to permit of determining and sighting the target on the ground, and helicopters at present fly only at a maximum speed equal to 70 m./s. (about 250 km./h.).

The chief object of the present invention is to provide an optical sighting device of a simpler construction and safer operation than those existing up to this time and in particular a sighting device including a single movable transparent plate bearing a marking, instead of a plurality of such plates as were to be used up to now.

The invention is based upon the fact that, in the above mentioned conditions, and if the vector joining the actual point A of the target and the future point F thereof seen in the eyepiece is called the vectorial prediction $\overrightarrow{AF}$ the modulus of the said vectorial prediction $\overrightarrow{AF}$ can be expressed as an approximate value, by;

(1) $$AF = K(R+R_1)$$

with (2) $$R = C + C_1\gamma$$

$\gamma$ being the angle made by the axis of the gun barrel with horizontal;

$R_1$, $C$ and $C_1$ being constants depending on the technical method of construction of the sighting plate;

$K$ being a constant for a given apparent speed of the target.

In other words, for a given apparent speed of the target, the modulus of the vectorial prediction $$\overrightarrow{AF}$$

(length of the segment AF in the eyepiece) is a linear function of the angle $\gamma$ made by the barrel axis with the horizontal and the coefficient of proportionality of this linear function is a function of said apparent speed.

In what follows, the term "horizontal direction" will be used to designate the direction followed on the transparent plate by the image of a target moving perpendicularly to the vertical plane passing through the axis of the stationary barrel and the term "vertical direction" will be used to designate the direction followed by the same image of a target moving in said vertical plane. As a rule, the "horizontal direction" thus defined is truly horizontal whereas the "vertical direction" is somewhat inclined due to the fact that the eyepiece has its optical axis in such manner that the gunner can look therethrough somewhat in a downward direction.

The projections of the vectorial prediction $$\overrightarrow{AF}$$

in the above defined horizontal and vertical directions supply a horizontal component $\Delta b$ and a vertical component $\Delta a$, respectively, of the said vectorial prediction $\overrightarrow{AF}$. The horizontal component $\Delta b$ will be taken to be very low in relation to the vertical component $\Delta a$ and in the following description the modulus of the vectorial prediction $$\overrightarrow{AF}$$

will be assimilated to the length of its vertical component $$\Delta a(|\overrightarrow{AF}|=\Delta a)$$

The invention consists, in such optical sighting devices, in providing a single transparent plate with a marking line of generally horizontal direction and in providing a mechanism capable of automatically displacing this plate in the vertical direction by an amount directly proportional to the angle made by the barrel axis with the horizontal, this mechanism including a device enabling the gunner to adjust the coefficient of proportionality in accordance with the estimated apparent speed of the target.

The invention is illustrated, by way of example, in the accompanying drawings in which:

FIG. 2 shows on a larger scale, with parts in section, the optical sighting device of FIG. 1;

In the following description it will be supposed that the sighting device is for a gun of a caliber ranging from 20 to 30 mm.

Figure 1:
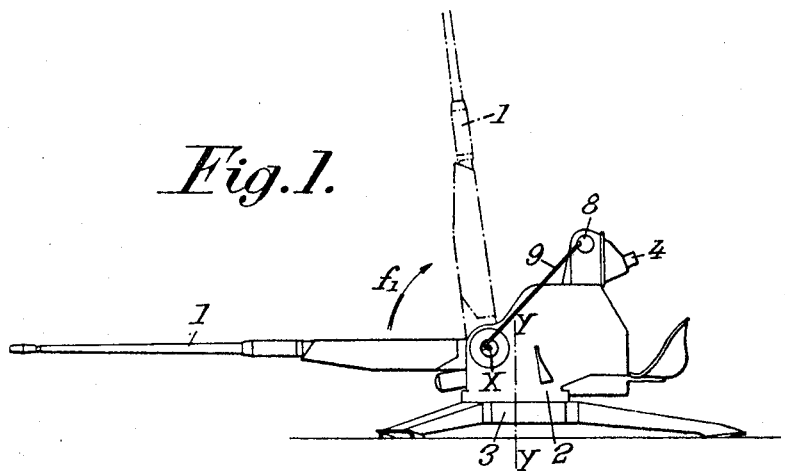
FIG. 1 is an elevational view of a light anti-aircraft gun provided with an optical sighting device according to the present invention.

The gun comprises a barrel 1 pivotable about a horizontal axis X (between two positions shown in solid lines and in dot-and-dash lines, respectively, in FIG. 1), which horizontal axis X is fixed with respect to a platform 2 rotatable about a vertical axis Y—Y with respect to a fixed base 3 of the tripod type.

Figure 2:
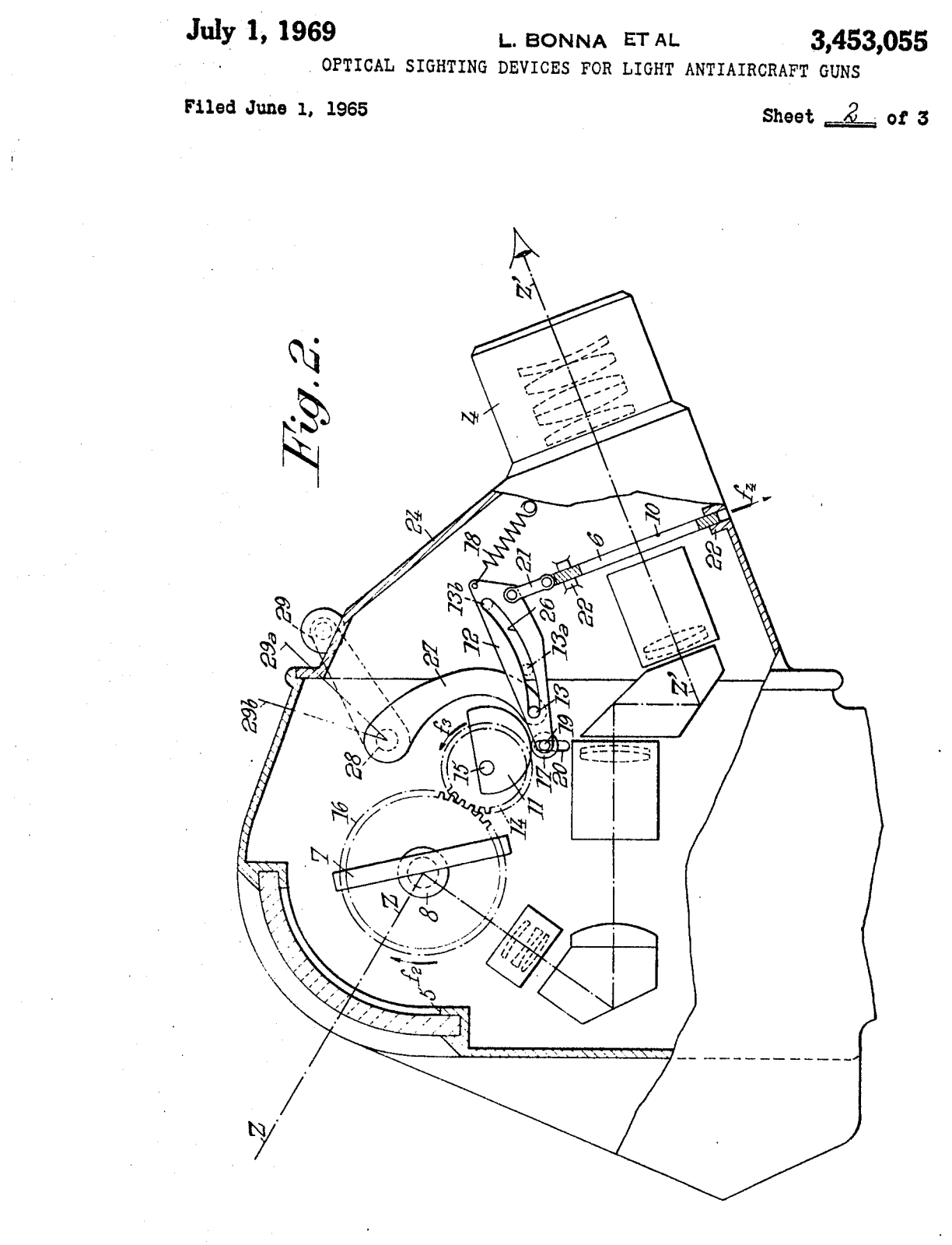

The sighting apparatus comprises the following elements, as shown by FIG. 2;

(a) An eyepiece 4 and a window 5 fixed with respect to platform 2;

(b) Optical means, operatively connected with barrel 1, for sending into eyepiece 4, whatever be the inclination of the barrel between the two positions illustrated in FIG. 1, a light beam Z—Z substantially parallel to barrel 1 and passing through window 5; and (c) Between said optical means and eyepiece 4, a transparent plate 6 bearing a marking and adapted to be automatically displaced in accordance with the movements of barrel 1.

The above mentioned optical means may consist of a mirror 7 mounted on a rotating spindle 8 and connected with barrel 1 through means diagrammatically represented in FIG. 1 by a connecting rod 9, said means being such that, when barrel 1 turns through a given angle about horizontal axis X—X, for instance in the direction of arrow $f_1$, axis 8 rotates through a proportional angle in the direction of arrow $f_2$ (FIG. 2).

The "horizontal direction" above referred to is truly horizontal in FIG. 2, whereas the "vertical direction" is perpendicular to the optical Z'—Z' of eyepiece 4, that is to say it is slightly inclined in the construction illustrated by FIG. 2.

Figure 4:
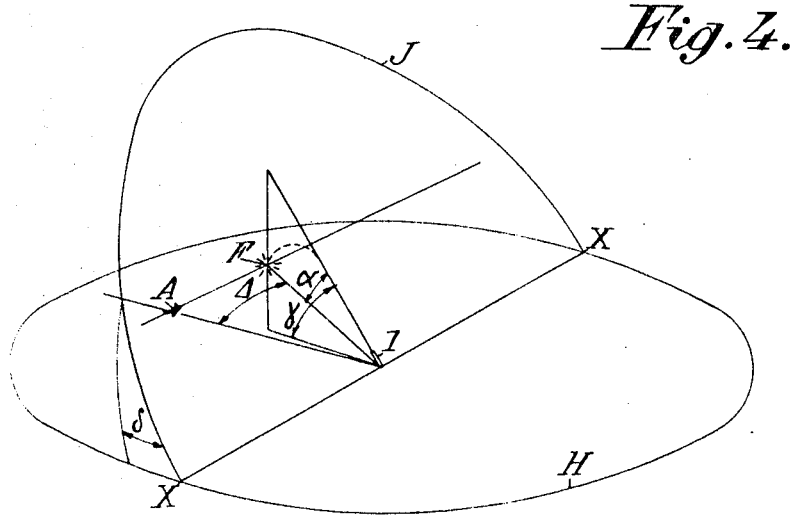
FIG. 4 is a diagrammatical view indicating the parameters brought into play in the usual sighting operations.

FIG. 4 indicates some of the different parameters coming into play for aiming the gun. If it is supposed that the intersection of axes X—X and Y—Y is at the center of a sphere, circle H is the cross section of this sphere by a horizontal plane and half circle J is the cross section by a plane passing through the actual point A of the target and through the future point F thereof where the projectile from the gun is to strike the target. The prediction $\Delta$ is the angle formed by the radii of the sphere passing through points A and F, $\alpha$ is the angle made by the axis of the gun barrel with the radius of the sphere passing through point F, to take into account the parabolic trajectory of the projectile. Having reference to the conditions in which such guns are to be used, the angle $\alpha$ is very small and the gun barrel is directed substantially towards the future point F. In FIGURE 4 the value of the angle $\alpha$ is very exaggerated. $\delta$ is the angle made by the plane of half circle J with the vertical meridian plane passing through the point where line 1A intersects the sphere. Finally $\gamma$ is the angle made by the axis of the gun barrel with the horizontal.

Figure 6:
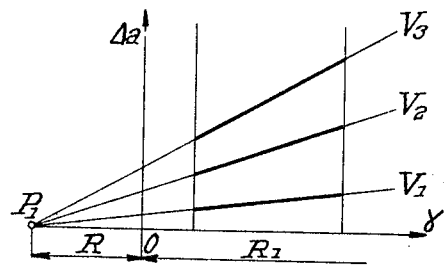
FIG. 6 shows a family of curves illustrating the principle of the invention.

The above indicated Equations 1 and 2 have been illustrated by FIG. 6 where the vertical component $\Delta a$ the vectorial prediction $$\overrightarrow{AF}$$

has been plotted in ordinates and the angle $\gamma$ in abscissas, for various values $V_1$, $V_2$, $V_3$ of the apparent speed of the aircraft, 0 being the origin of the coordinates. For the range of utilization of the gun limited by two vertical lines, the variation of $\Delta a$ is represented, with a very good approximation, by segments of straight lines converging at a point $P_1$ where $\Delta a = 0$. Consequently, this point corresponds to the case of diving aircraft (apparent horizontal speed equal to zero), whatever be their absolute speed.

Now, in the construction of the present invention, there is only one transparent plate 6, which bears a marking line 10 of generally horizontal direction (see FIGS. 2 and 3) and there is provided a mechanism for automatically displacing this vertical plate with an amplitude displacing this transparent plate in a vertical direction by an amount directly including a device enabling the gunner to adjust the coefficient of proportionality according to the estimated apparent speed of the target.

Said mechanism is constituted by a cam 11 having its outline in the form of a portion of a spiral of Archimedes the angular displacements of which are proportional to the variations of angle $\gamma$ and by a lever 12 one end of which cooperates with cam 11 whereas its other end cooperate with plate 6, which lever 12 is pivotable about a spindle 13 the position of which is adjustable by the gunner in the longitudinal direction of said lever 12.

For this purpose, cam 11 is rigid with a pinion 14 journalled about axis when it also mounts cam 11 and in mesh with a pinion 16 rigid with spindle 8. Lever 12 carries a roller 17 applied against the periphery of cam 11 by a spring 18, the spindle 19 of said roller 17 being guided in a slideway 20. A connecting rod 21 is pivoted at one end thereof to lever 12 and at the other end to plate 6 which is slidable in guides 22 so as to be movable perpendicularly to the optical axis Z'—Z'. The whole is such that, when the angle $\gamma$ made by the axis of the gun barrel with the horizontal increases (direction of the arrow $f_1$ of FIG. 1), cam 11 rotates in a direction (arrow $f_3$ of FIG. 2) such that plate 6 moves in the direction (arrow $f_4$ of FIG. 2) which increases the vertical component $\Delta a$ of the vectorial prediction $$\overrightarrow{AF}$$

Figure 5:
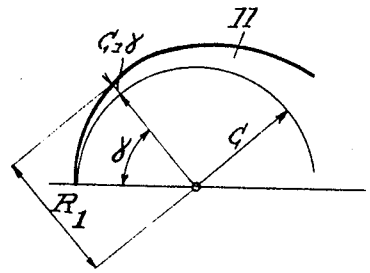
FIG. 5 shows the outline of a cam included in the device of FIG. 2.

The shape of this cam 11 is indicated by FIG. 5, reference letters R, $R_1$, C, $C_1$ and $\gamma$ having been defined above.

Figure 8:
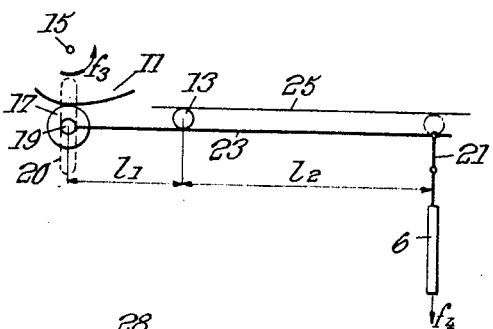
FIG. 8 shows a modification of the elements of FIG. 7.

As shown by FIG. 8, the lever which cooperates with cam 11 and plate 6 may be connected to spindle 13 by providing in this lever, a rectilinear groove 23 adapted to accommodate spindle 13 and by providing on the casing 24 of the sighting device a bearing face 25, also rectilinear, for said spindle.

Figure 7:
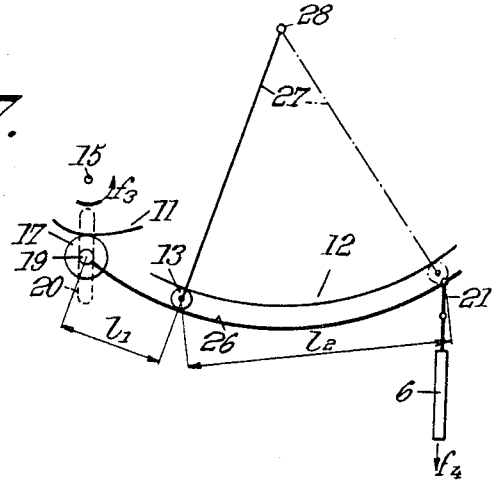
FIG. 7 shows the essential elements of the optical sighting device of FIG. 2.

However it seems more advantageous, as shown by FIGS. 2 and 7, to provide in lever 12 a groove 26 in the form of a circular arc and to have spindle 13 carried by a lever 27 pivoted to casing 24 about an axis 28 passing through the center of said circular arc and carrying a crank handle 29 located on the outside of casing 24.

Fixed abutments located at positions 13 and 13b (FIG. 2) limit the ends of the circular arc along which spindle 13 is movable and a resilient stopping device is provided for an intermediate position 13a of said spindle between positions 13 and 13b. There may be other intermediate positions with resilient stopping means. The two end positions 13 and 13b correspond, respectively, to the maximum speed of the target and to the zero apparent speed (corresponding to the target diving toward the gun). To the positions 13, 13a and 13b of spindle 13 correspond the positions 29, 29a and 29b, respectively, of crank handle 29.

In the position corresponding to diving of the target toward the gun, spindle 13 is located close to the pivot connection between connecting rod 21 and lever 12, so that this pivot connection then remains stationary whatever be the value of angle $\gamma$ and that line 10 then intersects the optical axis Z'—Z' of eyepiece 4.

Figure 3:
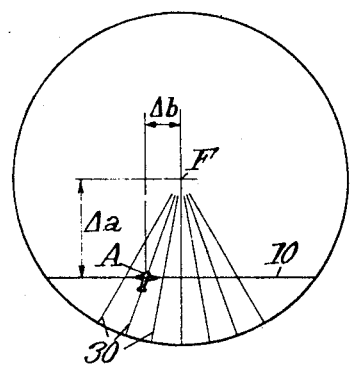
FIG. 3 shows the elements seen by the gunner through the eyepiece of the sighting device.

As above stated, marking line 10 has a generally horizontal direction. It may be rectilinear as shown by FIG. 3, or be slightly curved and in particular have the shape of a portion of an ellipse. In order to take into account the horizontal component $\Delta b$ of vectorial prediction $$\overrightarrow{AF}$$

it is of interest to trace, upon a fixed transparent plate (not shown), lines 30 intersecting one another (in a manner known in itself) at a point located on the optical axis of eyepiece 4, that is to say on the image of future point F (FIG. 3). As it is known, the gunner must bring the image of target A on that of line 30 which coincides with the image of its trajectory to take $\Delta b$ into account.

The sighting device above described works as follows:

According to the kind of flight of the target, the gunner, through crank handle 29, brings spindle 13 into the desired position. It suffices then for him to move barrel 1 in such manner as to bring the image of the target into coincidence with the intersection of line 10 and of the suitable radial line 30 (FIG. 3). He can then shoot the gun.

Cam 11 materializes Equation 2 $R=C+C_1\gamma$, whereas by placing spindle 13 into the position corresponding to the kind of flight of the target, the gunner determines the respective values of the lever arms $I_1$ and $I_2$ shown by FIGS. 7 and 8 and, consequently, the coefficient K of Equation 1

$$\overrightarrow{AF}=K(R+R_1)$$

It will therefore be understood that marking line 10 (FIG. 3) is brought into the proper position for all conditions of use of the gun. Finally, lines 30 permit of taking into account the horizontal components $\Delta b$ of the vectorial prediction $$\overrightarrow{AF}$$

The aiming point is not exactly accurate, but the errors are very small and can be corrected by the gunner during firing.

Of course the sighting device above described is of very simple construction since it comprises only one movable plate 6 and its use is very simple since the gunner has only one operation to perform (through crank handle 29) to adjust the sighting device to the speed of the target.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. For use with a gun including a barrel pivotable about a horizontal axis on a platform pivotable about a vertical axis with respect to a fixed base, a sighting device which comprises, in combination, an eyepiece fixed with respect to said platform, means forming a vertically elongated window fixed with respect to said platform, optical means operatively connected with the gun barrel for directing into said eyepiece the light beam parallel to said barrel passing through said window, a transparent plate supported by said platform, operatively connected with said barrel, said transparent plate carrying a marking line of general horizontal direction to enable the gunner placed on the platform to aim the gun by causing said marking line to coincide with the image of the target supplied by said optical means, a mechanism operative by the gun barrel for automatically imparting to said plate a displacement with respect to said platform in a direction at right angles to said line of an amplitude proportional to the angle made by the barrel axis with the horizontal and a device operative by the gunner to adjust the proportionality of said displacement in accordance with the estimated apparent speed of the target said device further comprising a fixed transparent plate carrying convergent lines intersecting one another on the optical axis of said eyepiece, said lines serving to take into account the vertical component of the prediction angle.

2. For use with a gun including a barrel pivotable about a horizontal axis on a platform pivotable about a vertical axis with respect to a fixed base, a sighting device which comprises, in combination,
    an eyepiece fixed with respect to said platform,
    means forming a vertically elongated window fixed with respect to said platform,
    optical means operatively connected with the gun barrel for directing into said eyepiece, whatever be the inclination of the barrel with respect to the platform, the light beam substantially parallel to said barrel passing through said window,
    a substantially vertical transparent plate bearing a marking line of generally horizontal direction, said plate being mounted movable with respect to the platform with a translatory motion in its own plane perpendicularly to said marking line,
    a cam having its outline in the form of a spiral of Archimedes pivoted about an axis passing through the origin of said spiral and perpendicular to the plane of said outline, said axis being fixed with respect to said platform,
    means for operatively connecting said cam with said barrel for causing the rotation of said cam about said last mentioned axis to be proportional to the rotation of said gun barrel about said horizontal axis,
    a lever having one end thereof movable along the outline of said cam and the other end thereof linked with said transparent plate,
    a spindle parallel to said last mentioned axis forming a variable position pivot axis for said lever, and
    means operative by the gunner for moving said spindle along said lever in accordance with the estimated apparent speed of the target.

3. For use with a gun including a barrel pivotable about a horizontal axis on a platform pivotable about a vertical axis with respect to a fixed base, a sighting device which comprises, in combination,
    an eyepiece fixed with respect to said platform,
    means forming a vertically elongated window fixed with respect to said platform,
    optical means operatively connected with the gun barrel for directing into said eyepiece, whatever be the inclination of the barrel with respect to the platform, the light beam substantially parallel to said barrel passing through said window, said optical means including a mirror pivotable with respect to said platform about an axis parallel to said horizontal axis and means for operatively connecting said mirror with said barrel so that the angles through which said mirror pivots above its axis are proportional to the angles through which said barrel pivots simultaneously about its horizontal axis, a substantially vertical transparent plate bearing a marking line of generally horizontal direction, said plate being mounted movable with respect to the platform with a translatory motion in its own plane perpendicularly to said marking line, a cam having its outline in the form of a spiral of Archimedes pivoted about an axis passing through the origin of said spiral and perpendicular to the plane of said outline, said axis being fixed with respect to said platform, a first pinion rigid with said cam, a second pinion rigid with said mirror and in mesh with said first pinion, whereby the rotation of said cam about its axis is proportional to the rotation of said gun barrel about its horizontal axis, a lever, a roller carried by one end of said lever, spring means for urging said roller against the periphery of said cam, a connecting rod having one end thereof pivotally connected to the other end of said lever and the other end thereof pivotally connected to said transparent plate, a spindle parallel to said last mentioned axis forming a variable position pivot axis for said lever, and means operative by the gunner for moving said spindle along said lever in accordance with the estimated apparent speed of the target.

4. A sighting device according to claim 2 wherein said lever is provided with a rectilinear groove, further comprising, a casing for said device fixed with respect to said platform, said casing being provided with a bearing face which is rectilinear, said spindle being adapted to move along both said rectilinear groove and said bearing face.

5. A sighting device according to claim 2 wherein said lever is provided with a groove in the form of a circular arc, further comprising, a casing for said device fixed with respect to said platform, a lever pivoted about an axis passing through the center of said circular arc, said lever carrying said spindle, and an operating member rigid with said lever and located on the outside of said casing.

References Cited

UNITED STATES PATENTS 3,289,534  12/1966  Becker et al. _____ 33—48 XR

RONALD L. WIBERT, *Primary Examiner.*

O. B. CHEW, *Assistant Examiner.*

U.S. Cl. X.R.

89—41